(12) United States Patent
Göring

(10) Patent No.: US 6,224,079 B1
(45) Date of Patent: May 1, 2001

(54) ROTOR SYSTEM FOR A BICYCLE

(75) Inventor: Thomas Göring, Karlsruhe (DE)

(73) Assignee: Wolfgang Goring, Karlsruhe (DE)

( * ) Notice: Subject to any disclaimer, the term of this patent is extended or adjusted under 35 U.S.C. 154(b) by 0 days.

(21) Appl. No.: 09/487,358

(22) Filed: Jan. 19, 2000

(30) Foreign Application Priority Data

Jun. 24, 1999 (DE) .............................. 199 29 093

(51) Int. Cl.$^7$ .................................................. B62M 15/00
(52) U.S. Cl. .................................................. 280/279
(58) Field of Search ................................ 280/279, 280

(56) References Cited

U.S. PATENT DOCUMENTS

| | | | |
|---|---|---|---|
| 4,616,523 | * 10/1986 | Jones | 280/279 |
| 4,653,768 | 3/1987 | Keys et al. . | |
| 4,753,448 | * 6/1988 | Nagashima | 280/279 |
| 4,770,435 | 9/1988 | Cristie . | |
| 5,615,585 | * 4/1997 | Chi | 280/279 |
| 5,992,869 | * 11/1999 | Yi-Chen | 280/279 |

FOREIGN PATENT DOCUMENTS

| | | |
|---|---|---|
| 571408 | 5/1924 | (FR) . |
| 885144 | 9/1943 | (FR) . |

OTHER PUBLICATIONS

Brian Scura; SST ORYG™ Cable Installation & Adjustment, 1996, 2 pages.
Odyssey®GYRO2 Installation Instructions, 1 page.

* cited by examiner

*Primary Examiner*—Brian L. Johnson
*Assistant Examiner*—Matthew Luby
(74) *Attorney, Agent, or Firm*—Alston & Bird LLP

(57) ABSTRACT

An improved rotor system includes bearings that are carried by the frame of a bicycle. The bearings are carried by the frame so that a stem of a fork of the bicycle extends through the bearings and the fork is capable of being rotated relative to the frame about an axis that is generally coaxial with the stem. The improved rotor system further includes upper and lower transmission elements that extend around the stem and are movable along the stem. The upper transmission element is rotatable about the axis relative to the lower transmission element. The upper transmission element is connected to the first brake cable line and is operative for moving along the stem in response to actuations of the first brake cable line. The lower transmission element is mounted for moving with the upper transmission element along the stem. The lower transmission element is connected to the second brake cable line so that actuation of the first brake cable line results in actuation of the second brake cable line. The improved rotor system further includes a casing that extends radially around the axis and the upper and lower transmission elements.

18 Claims, 2 Drawing Sheets

ROTOR SYSTEM FOR A BICYCLE

FIELD OF THE INVENTION

The invention relates to a rotor system that rotatably carries the fork of a bicycle so that the fork can rotate 360°, and that transmits actuations of a brake cable in a manner that prevents winding of the brake cable when the fork is rotated 360°.

BACKGROUND OF THE INVENTION

A known rotor system of this kind is used in a BMX freestyle bicycle (bicycle moto cross) for purposes of preventing the brake cables from winding in the case of steering motions and front wheel turns of more than 180°. To this end, the handlebar stem mounts above the frame-mounted steering head tube with the steering head sets for supporting the fork, two annular transmission elements, which are axially held together and capable of rotating relative to each other. A clearance between the handlebar stem and the transmission elements permits the latter to be rotated likewise relative to the handlebar stem. From the brake lever on the handlebar and from the brake on the rear wheel, one brake cable line each extends to one of the transmission elements and is attached thereto. To prevent canting, each brake cable line is present in duplicate and attached in places of the transmission elements that are opposite to one another in the circumferential direction.

SUMMARY OF THE INVENTION

It is the object of the invention to improve a rotor system of the initially described kind. This object is accomplished by an improved rotor system having bearings that are carried by the frame of a bicycle. The bearings are carried by the frame so that a stem of a fork of the bicycle extends through the bearings and the fork is capable of being rotated relative to the frame about an axis that is generally coaxial with the stem. The improved rotor system further includes upper and lower transmission elements that extend around the stem and are movable along the stem. The upper transmission element is rotatable about the axis relative to the lower transmission element. The upper transmission element is connected to a first brake cable line and is operative for moving along the stem in response to actuations of the first brake cable line. The lower transmission element is mounted for moving with the upper transmission element along the stem. The lower transmission element is connected to a second brake cable line so that actuation of the first brake cable line results in actuation of the second brake cable line. The improved rotor system further includes a casing that extends radially around the axis and the upper and lower transmission elements.

As a result of surrounding the transmission elements, to which the brake cable lines are attached with their cores, with a casing at least in the radial direction, a protection against negative influences from the outside, for example damage, is provided on the one hand for the transmission elements themselves and the mounting points for the brake cable lines. On the other hand, the user is also protected against injuries by the transmission elements that are often sharp-edged, and by the ends of the brake cable lines, from which sharp wires may project.

It is advantageous when the casing is frame-mounted. In an embodiment that is simple to realize and simultaneously cost-favorable, the casing is formed by the steering head tube already present on the frame, which receives the fork for purposes of supporting it. Preferably, the transmission elements are arranged in the axial direction between the steering head sets for supporting the fork, so that they are also protected in the axial direction. To have space available for the transmission elements, the steering head tube and the steering head sets have larger diameters, if need be, than the commonly used parts, or adapter pieces are provided.

In a preferred embodiment, the transmission elements are part of a rotor unit, which is movable as a whole relative to the fork, thereby facilitating assembly. Preferably, all transmission elements are arranged peripherally on the outside of the stem of the fork. Preferably, the rotor unit is axially displaceable on the stem of the fork, so that it is reliably guided by this handlebar stem. The axial length of the rotor unit is preferably greater than its diameter to prevent canting. In contrast to the initially described, known rotor system, only one brake cable line each is required in the place of two symmetrically arranged brake cable lines per transmission element. This makes it possible to use commercially available, inexpensive brake cable lines.

When a transmission element is rotated relative the other parts of the rotor unit, frictional heat occurs at fast movements. To protect against this frictional heat, it is preferred to provide a heat-resistant intermediate ring as a plain bearing between at least one transmission element and another part of the rotor unit.

For a simpler assembly of the rotor system, the casing for the transmission elements is provided in a preferred embodiment with at least one opening, which provides access from the outside to the place in which at least one brake cable line is mounted to a transmission element, for example, by means of a screw.

A bicycle that is designed and constructed in particular as a BMX freestyle bicycle, comprises a rotor system of the present invention to prevent the brake cable lines from twisting, and to be able to actuate the rear wheel brake at any time. The front wheel of such a bicycle can rotate 360°. To be able to keep even outside of the casing a brake cable line as close to the handlebar of the bicycle as possible without much freedom of movement, the projection, which is located on the fork for receiving the handlebar, preferably comprises a bore for the passage of the brake cable line.

BRIEF DESCRIPTION OF THE DRAWINGS

In the following, the invention is described in greater detail with reference to an embodiment illustrated in the drawing, in which.

DETAILED DESCRIPTION OF THE INVENTION

Figure 1:
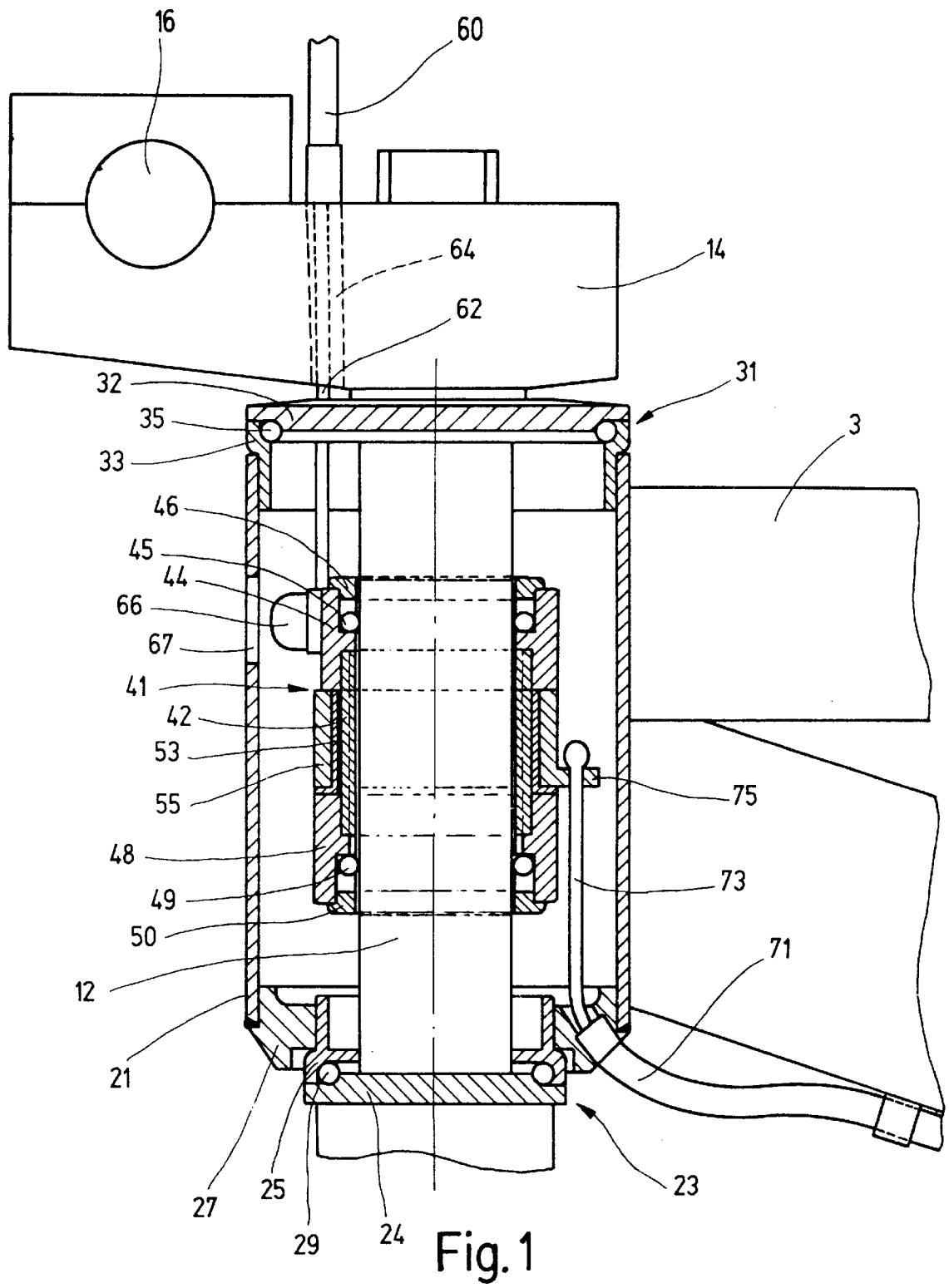
FIG. 1 is a partially sectioned side view of the embodiment.
Figure 2:
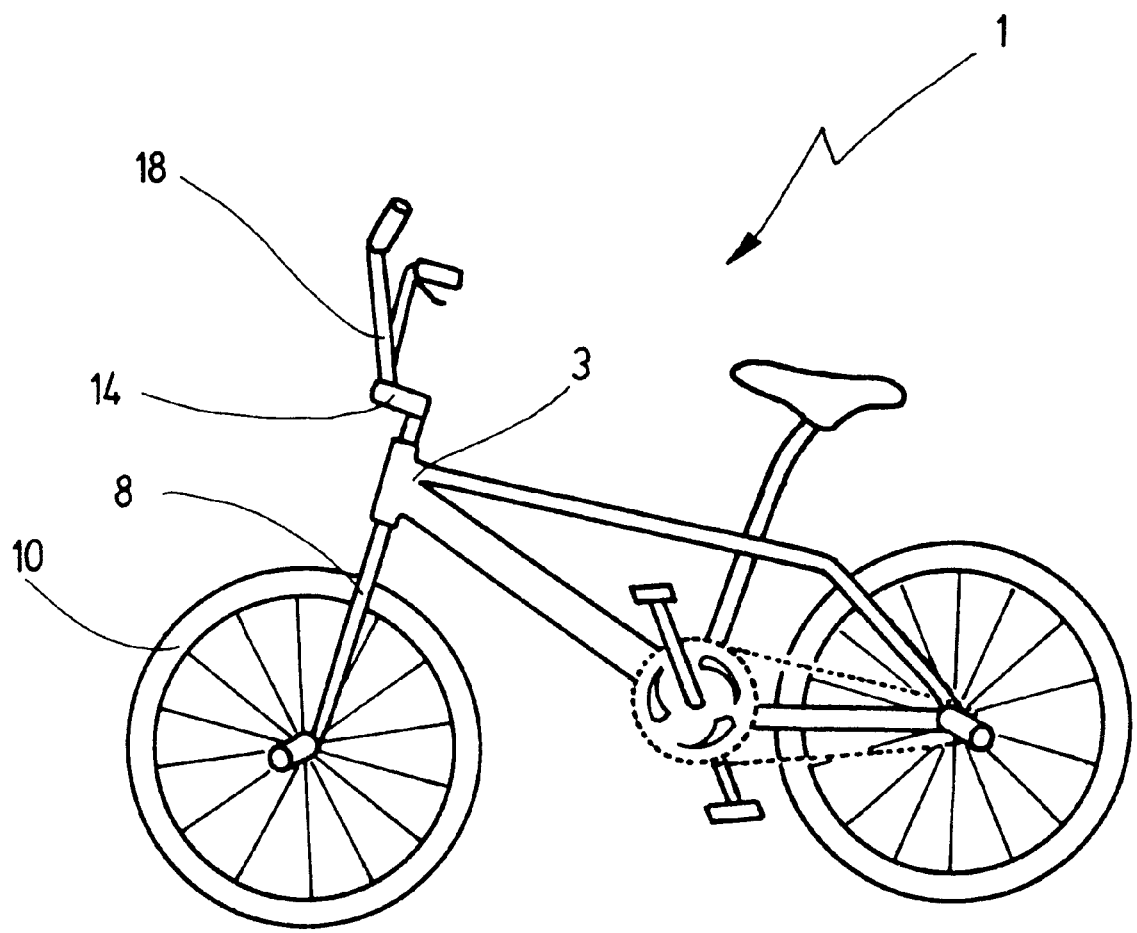
FIG. 2 is a side view of a bicycle according to the invention.

A bicycle generally indicated at 1, which is designed and constructed as a BMX freestyle bicycle, comprises a frame 3. At the front end of frame 3, a fork is supported for rotation. At its lower end, the fork 8 mounts the front wheel 10 of the bicycle 1. A handlebar stem 12 forming the top end of fork 8 rigidly mounts a projection 14. The projection 14 comprises a horizontally extending handlebar receptacle 16, which surrounds a handlebar 18 of the bicycle 1.

To support the fork 8, the frame 3 mounts a substantially circular-cylindrical steering head tube 21 with two open ends, which is aligned substantially vertically. Over a portion of its length, the handlebar stem 12 extends inside the steering head tube 21 in concentric relationship therewith. A lower steering head set 23 comprises a steering ring 24, which is pressed onto fork 8, and a lower bearing seat 25 rotatable relative to steering ring 24 with a passage for the handlebar stem 12. The lower bearing seat 25 is pressed into an adapter piece 27, which is mounted to the lower end of the steering head tube 21, for example, welded thereto. Between the fork-mounted steering ring 24 and the frame-mounted, lower bearing seat 25, a ball bearing 29 is provided. An upper steering head set 31 comprises a round steering plate 32, which is attached to the handlebar stem 12, and an upper bearing seat 33 rotatable relative to the steering plate 32. The upper bearing seat 33 is pressed into steering head tube 21 at the upper end thereof. A further ball bearing 35 is provided between the fork-mounted steering plate 32 and the frame-mounted, upper bearing seat 33.

Between the upper steering head set 31 and the lower steering head set 23, a rotor unit 41 is arranged inside the steering head tube 21. The steering head tube 21, the two steering head sets 23 and 31, and the rotor unit 41 form a rotor system. The rotor unit 41 is mounted for sliding movement on the handlebar stem 12 in axial direction. The rotor unit 41 comprises a threaded sleeve 42, which surrounds the handlebar stem 12 with a slight play. Screwed to the upper end of threaded sleeve 42 is a first, annular transmission element 44, which surrounds the handlebar stem 12. Balls 45 support the first transmission element 44 for easy motion on handlebar stem 12. An upper cover 46 shields the balls 45.

Screwed to the lower end of threaded sleeve 42 is a holding element 48, which is designed and constructed similarly to the first transmission element 44. The holding element 48 surrounds likewise the handlebar stem 12. Balls 49 support the holding element 48 for easy motion on handlebar stem 12. A lower cover 50 shields the balls 49. Between the upper transmission element 44 and the holding element 48, the threaded sleeve 42 mounts an intermediate ring 53. In this region, the threaded sleeve 42 has no screw thread. The intermediate ring 53 is used as a plain bearing and adapted for easy rotation relative to threaded sleeve 42. Preferably, the intermediate ring 53 consists of Teflon, so as to be resistant to occurring frictional heat. At its lower edge, the intermediate ring 53 mounts a flange.

The intermediate ring 53 mounts a second, annular transmission element 55 of aluminum. By means of a slight play, the second transmission element 55 is adapted for easy rotation relative to intermediate ring 53 and other parts of rotor unit 41. In the axial direction, the second transmission element 55 is displaceable together with the other parts of rotor unit 41, but cannot be displaced relative to threaded sleeve 42. For the two transmission elements 44 and 55, the steering head tube 21 forms a casing, which offers a protection in radial direction (with respect to the rotation of the two transmission elements 44 and 55).

An upper brake cable line 60 extends to projection 14 from a brake lever (FIG. 1) on handle bar 18 (FIG. 1). The casing of the upper brake cable line 60, which is designed and constricted as a Bowden cable, is attached by means of a screw coupling to the upper surface of projection 14. A core 62 of the upper brake cable line extends through a vertical bore 64 in projection 14 to the underside thereof. Through an opening in steering plate 32 and through the open interior of upper bearing seat 33, the core 62 of the upper brake cable line 60 extends into the interior of steering head tube 21. By means of a fastening screw 66 that can be screwed laterally into the first transmission element 44, the core 62 of the upper brake cable line 60 is attached to the upper transmission element 44. Preferably, the fastening screw 66 is accessible from outside through, for example, an oval opening 67 in steering head tube 21. The opening 67 is covered, preferably by a cap.

A lower brake cable line 71 extends along frame 3 to steering head tube 21 from a rear wheel brake not shown in the drawing. The casing of the lower brake cable line 71, which is designed and constructed as a Bowden cable, is attached to adapter piece 27, whereas a core 73 of the lower brake cable line 71 extends through an opening in adapter piece 27 into the interior of steering head tube 21. The second transmission element 55 comprises a lateral hookup arrangement 75. The core 73 of the lower brake cable line 71 engages the hookup arrangement 75 with a spherical, thickened portion provided at its one end, and it is thus secured to the lower transmission element 55.

If the user of bicycle 1 intends to perform a steering motion, it will turn, via handlebar 18, the fork 8 and, thus, the front wheel 10. During this turning motion, the core 62 of the upper brake cable line 60 entrains the first transmission element 44 including threaded sleeve 42 and holding element 48, if need be, with a delay relative to the handlebar stem 12. The second transmission element 55 remains, together with the core 73 of the lower brake cable line 71 attached thereto, in the position which it has occupied relative to the frame-mounted steering head tube 21. A displacement of rotor unit 41 along the handlebar stem 12 does not occur or only inconspicuously.

If the user of bicycle 1 intends to brake, it will exert a pull, via the brake lever core 62, on the upper brake cable line and, thus, on the first transmission element 44. This causes the rotor unit 41 to move upward along handlebar stem 12, so that the second transmission element 55 is likewise pulled upward via holding element 48 and the flange of intermediate ring 53. The second transmission element 55 exerts again a pull on core 73 of the lower brake cable line 71, thereby actuating the rear wheel brake. Thus, the actuation of the brake cable lines is transmitted by means of rotor unit 41. The dimensions of rotor unit 41 are selected such that its axial length is greater than its diameter.

The brake cable line for the front wheel brake extends through a channel in hollow handlebar stem 12, which is not shown in the drawing. If only one brake lever is to actuate the rear wheel brake and front wheel brake at the same time, the rotor unit 41 may mount, for example, on holding element 48, the core of a Bowden cable, which can then extend through the lower bearing seat 25 to the front wheel brake.

That which is claimed:

1. A rotor system for transmitting actuations of brake cable lines of a bicycle that comprises a frame that carries a fork comprising a stem, the rotor system comprising:

bearings capable of being carried by the frame so that the stem of the fork extends through the bearings and the fork is capable of being rotated relative to the frame about an axis that is generally coaxial with the stem;

upper and lower transmission elements that are capable of extending around the stem, wherein the upper and lower transmission elements are movable axially along the stem and are rotatable relative to each other about the axis while extending around the stem, and while the upper and lower transmission elements are extending around the stem:

the upper transmission element is capable of being connected to a first one of the brake cable lines and is operative for moving axially along the stem in response to actuations of the first brake cable line, the lower transmission element is mounted for moving with the upper transmission element axially along the stem, and the lower transmission element is capable of being connected to a second one of the brake cable lines so that actuation of the first brake cable line results in actuation of the second brake cable line; and a casing capable of extending radially around the axis and the upper and lower transmission elements while the upper and lower transmission elements are extending around the stem.

2. A rotor system according to claim 1, wherein the casing is mounted to the frame.

3. A rotor system according to claim 2, wherein the casing is a steering head tube.

4. A rotor system according to claim 1, wherein the bearings are displaced from one another along the axis and the upper and lower transmission elements are positioned between the bearings.

5. A rotor system according to claim 1, wherein the upper and lower transmission elements at least partially define a rotor unit that is movable relative to the fork.

6. A rotor system according to claim 5, wherein:

the stem extends in an axial direction that is generally parallel to the axis;

the rotor unit is movable along the stem generally in the axial direction;

the rotor system defines a length that extends generally in the axial direction; and the rotor system defines a diameter that is generally perpendicular to the axial direction and that is less than the length.

7. A rotor system according to claim 5, wherein the rotor unit comprises:

a sleeve; and a heat-resistant intermediate ring extending around the sleeve, wherein the intermediate ring is positioned between the sleeve and a transmission element selected from the group consisting of the upper and lower transmission elements.

8. A rotor system according to claim 1, wherein:

the upper transmission element is connected to a first one of the brake cable lines;

the lower transmission element is connected to a second one of the brake cable lines; and the casing defines an opening through which it is possible to access the connection between the upper transmission element and the first brake cable line.

9. A bicycle, comprising:

a frame;

a fork comprising a stem;

first and second brake cable lines; and a rotor system comprising:

bearings carried by the frame, wherein the stem extends through and is carried by the bearings such that the fork is capable of being rotated relative to the frame about an axis that is generally coaxial with the stem, upper and lower transmission elements that extend around the stem and are movable axially along the stem, wherein the upper transmission element is rotatable about the axis relative to the lower transmission element, the upper transmission element is connected to the first brake cable line and is operative for moving along the stem in response to actuations of the first brake cable line, the lower transmission element is mounted for moving with the upper transmission element axially along the stem, and the lower transmission element is connected to the second brake cable line so that actuation of the first brake cable line results in actuation of the second brake cable line, and a casing extending radially around the axis and the upper and lower transmission elements.

10. A bicycle according to claim 9, wherein the bicycle is a BMX freestyle bicycle.

11. A bicycle according to claim 9, further comprising:

a projection mounted to the stem and defining a bore through which the first brake cable line extends; and a handlebar mounted to the projection.

12. A bicycle according to claim 9, wherein the casing is mounted to the frame.

13. A bicycle according to claim 12, wherein the casing is a steering head tube.

14. A bicycle according to claim 9, wherein the bearings are displaced from one another along the axis and the upper and lower transmission elements are positioned between the bearings.

15. A bicycle according to claim 9, wherein the upper and lower transmission elements at least partially define a rotor unit that is movable relative to the fork.

16. A bicycle according to claim 15, wherein:

the stem extends in an axial direction that is generally parallel to the axis;

the rotor unit is movable along the stem generally in the axial direction;

the rotor system defines a length that extends generally in the axial direction; and the rotor system defines a diameter that is generally perpendicular to the axial direction and that is less than the length.

17. A bicycle according to claim 15, wherein the rotor unit comprises:

a sleeve; and a heat-resistant intermediate ring extending around the sleeve, wherein the intermediate ring is positioned between the sleeve and lower transmission element.

18. A bicycle according to claim 9, wherein the casing defines an opening through which it is possible to access the connection between the upper transmission element and the first brake cable line.

* * * * *